United States Patent
Skoglund et al.

(10) Patent No.: US 10,723,465 B2
(45) Date of Patent: Jul. 28, 2020

(54) ROUTABLE BACKUP POWER CONTROL UNITS

(71) Applicant: Rosemount Aerospace Inc., Burnsville, MN (US)

(72) Inventors: Jason Lee Skoglund, New Hope, MN (US); Harry Garnett, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 342 days.

(21) Appl. No.: 15/840,778

(22) Filed: Dec. 13, 2017

(65) Prior Publication Data
US 2019/0176993 A1    Jun. 13, 2019

(51) Int. Cl.
| | | |
|---|---|---|
| B64D 15/12 | (2006.01) | |
| H05B 1/02 | (2006.01) | |
| B64D 33/02 | (2006.01) | |
| H02J 4/00 | (2006.01) | |
| H02J 9/02 | (2006.01) | |
| H02J 3/00 | (2006.01) | |

(52) U.S. Cl.
CPC ............. *B64D 15/12* (2013.01); *B64D 33/02* (2013.01); *H02J 3/0073* (2020.01); *H02J 4/00* (2013.01); *H02J 9/02* (2013.01); *H05B 1/0236* (2013.01); *B64D 2033/0233* (2013.01); *B64D 2221/00* (2013.01); *H05B 2203/035* (2013.01); *H05B 2203/037* (2013.01)

(58) Field of Classification Search
CPC .................... B64D 15/12; B64D 33/02
USPC .......................................... 219/202, 138–480
See application file for complete search history.

(56) References Cited

U.S. PATENT DOCUMENTS

| | | |
|---|---|---|
| 7,922,121 B2 | 4/2011 | Gaertner, II et al. |
| 8,550,402 B2 | 10/2013 | Houlihan et al. |
| 8,820,683 B2 | 9/2014 | Stonestreet, II et al. |
| 2011/0260534 A1 | 10/2011 | Rozman et al. |

FOREIGN PATENT DOCUMENTS

| | | |
|---|---|---|
| EP | 3220501 A1 | 9/2017 |
| GB | 2449651 A | 3/2008 |
| WO | WO9718612 A1 | 5/1997 |

OTHER PUBLICATIONS

Extended European Search Report for EP Application No. 18206018.6, dated Feb. 21, 2019, pp. 8.

*Primary Examiner* — Lori L Baker
(74) *Attorney, Agent, or Firm* — Kinney & Lange, P. A.

(57) ABSTRACT

A system and method for controlling power includes a power source, a plurality of primary control circuits, a load, at least one secondary control circuit, a switch circuit, and a control channel. The plurality of primary control circuits are connected to control load power from the power source to respective ones of a plurality of load power inputs. The load is configured to receive power from the plurality of load power inputs. The at least one secondary control circuit is connected to the power source, and the switch circuit is connected between the at least one secondary control circuit and the plurality of load power inputs. The control channel is configured to control the switch circuit to connect the at least one secondary control circuit to a selected one of the plurality of load power inputs.

20 Claims, 4 Drawing Sheets

ROUTABLE BACKUP POWER CONTROL UNITS

BACKGROUND

The present invention relates generally to redundant power control, and in particular to a system and method for connecting redundant power controllers to loads.

Safety critical systems, such as those found on aircraft, often require redundant control systems. For example, aircraft ice protection systems require redundant power control for heater assemblies. In prior redundant ice protection system, each power control unit is backed up by a dedicated spare power control unit, providing a one-to-one relationship between primary power control units and backup power control units. Upon failure of one of the primary power control units, the respective backup power control unit assumes control. Requiring a backup control unit for each primary control unit greatly increased the size and complexity of the system. To reduce the size, weight and complexity of these systems, it is desirable to eliminate the need for each primary control unit to have a respective dedicated backup control unit.

SUMMARY

A system includes a power source, a plurality of primary control circuits, a load, at least one secondary control circuit, a switch circuit, and a control channel. The plurality of primary control circuits are connected to control load power from the power source to respective ones of a plurality of load power inputs. The load is configured to receive power from the plurality of load power inputs. The at least one secondary control circuit is connected to the power source, and the switch circuit is connected between the at least one secondary control circuit and the plurality of load power inputs. The control channel is configured to control the switch circuit to connect the at least one secondary control circuit to a selected one of the plurality of load power inputs.

A method of controlling power to a load includes controlling, by a plurality of primary control circuits, power from a power source to respective ones of a plurality of load power inputs; monitoring, by a control channel, the plurality of primary control circuits for faults; detecting, by the control channel, a fault in one of the plurality of primary control circuits, wherein the one of the plurality of primary control circuits is connected to provide the power from the power source to one of the plurality of load power inputs; and controlling, by the control channel, a switch circuit to connect a secondary control circuit to provide the power from the power source to the one of the plurality of load power inputs.

DETAILED DESCRIPTION

A redundant power control architecture is disclosed herein that includes spare power control circuits capable of providing redundant power control for multiple primary power control circuits. The power control system includes several primary power control circuits and at least one secondary power control circuit. The primary power control circuits are positioned to control power from a power bus to a load. For example, the load may be a heater assembly that includes several heater zones. Each primary power control circuit may be configured to control power provided to a respective heater zone.

A control channel is configured to monitor the primary control circuits and detect any faults or failures. The secondary control circuit is connected between the power bus and a switch circuit. The switch circuit is connected between the secondary control circuit and the power input lines to the load. Upon detection of a fault or failure in one of the primary control circuits, the control channel controls the switch circuit to connect the secondary control circuit to the respective power input line of the load in place of the faulty primary control circuit. By using the switch circuit, multiple primary control circuits may be backed up by a single secondary control circuit. This provides redundancy for all primary control circuits while reducing the size, weight, and complexity of the power system.

Figure 1:
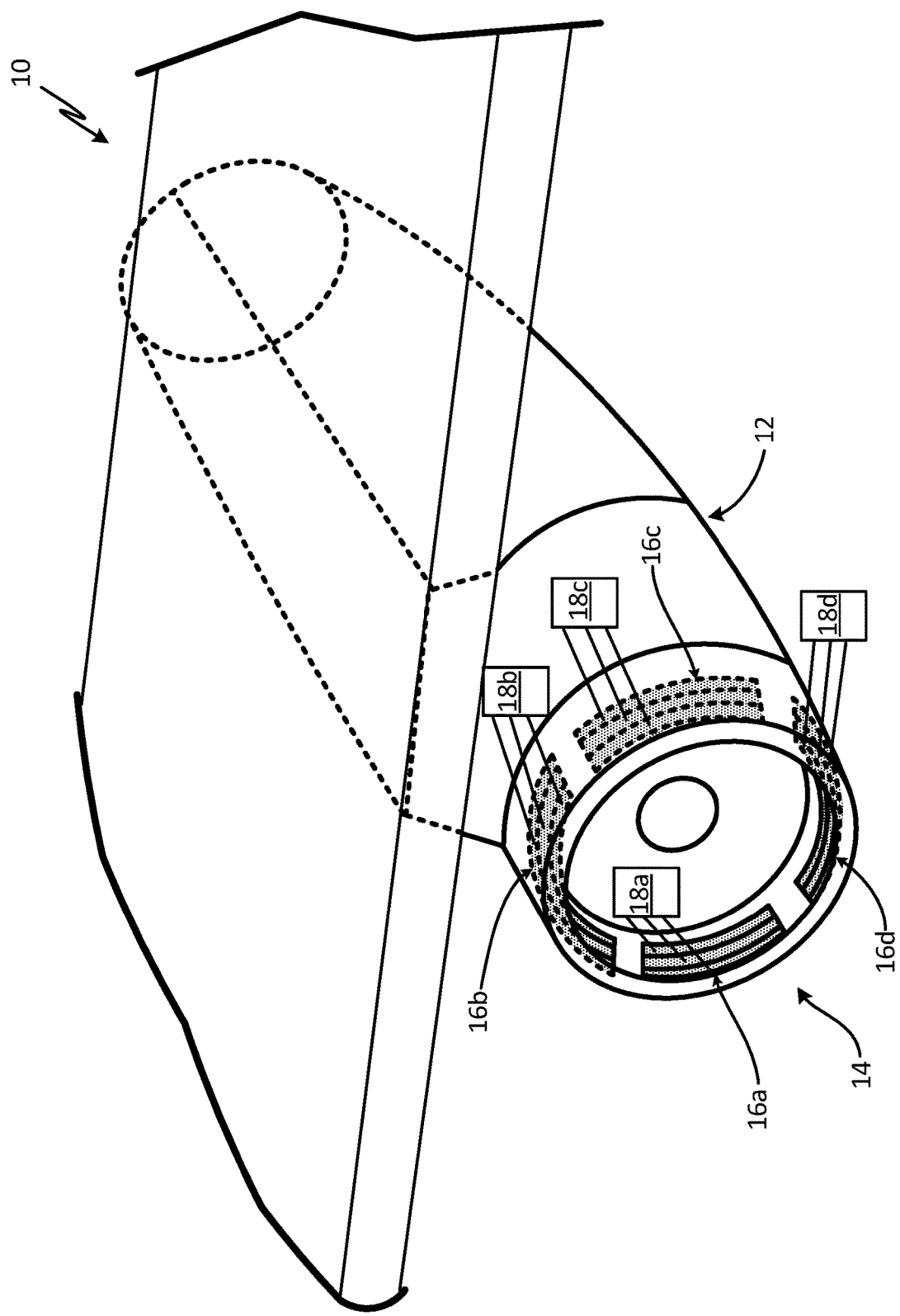
FIG. 1 is a diagram illustrating an embodiment of a nacelle inlet ice protection system.

FIG. 1 is a diagram illustrating an embodiment of an ice protection system 10 for an engine nacelle 12. Ice protection system 10 is configured to provide ice protection for inlet 14 of engine nacelle 12. In the embodiment illustrated in FIG. 1, heater assemblies 16a-16d are positioned circumferentially around inlet 14 to provide heating for inlet 14. Each heater assembly 16a-16d has multiple zones, each connected to a respective heater control unit 18a-18n. While illustrated as four heater assemblies 16a-16d each having three zones, any number of heater assemblies each having any number of zones may be utilized. While illustrated and described for an ice protection system, control units 18a-18n may be utilized for any critical power control system that requires redundant power control.

Control units 18a-18d are configured to control power to respective zones of heater assemblies 16a-16n. For example, each heater assembly 16a-16n may include three zones, one zone for each phase aircraft alternating current (AC) power. Control units 18a-18d may include individual controllers for each phase of power and selectively control each phase to control each zone of the respective heater assembly 16a-16n. This way, the ice protection system can actively control heating for each zone of each heater assembly 16a-16n for ice protection system 10. In other examples, each heater assembly 16a-16n can include three zones that are each powered by all three phases of the AC power (e.g., connected in a wye or delta configuration). In such examples, each of control units 18a-18d may include individual controllers that control the three-phase AC power to each of the separate zones.

The positioning of control units 18a-18d in FIG. 1 is used to show the connection to heater assemblies 16a-16d. The actual physical location of control units 18a-18d may be anywhere on or in the aircraft engine, wing, or body. Ice protection system 10 may be a safety critical system and thus, control units 18a-18n may require redundant control for respective heater assemblies 16a-16d.

Figure 2:
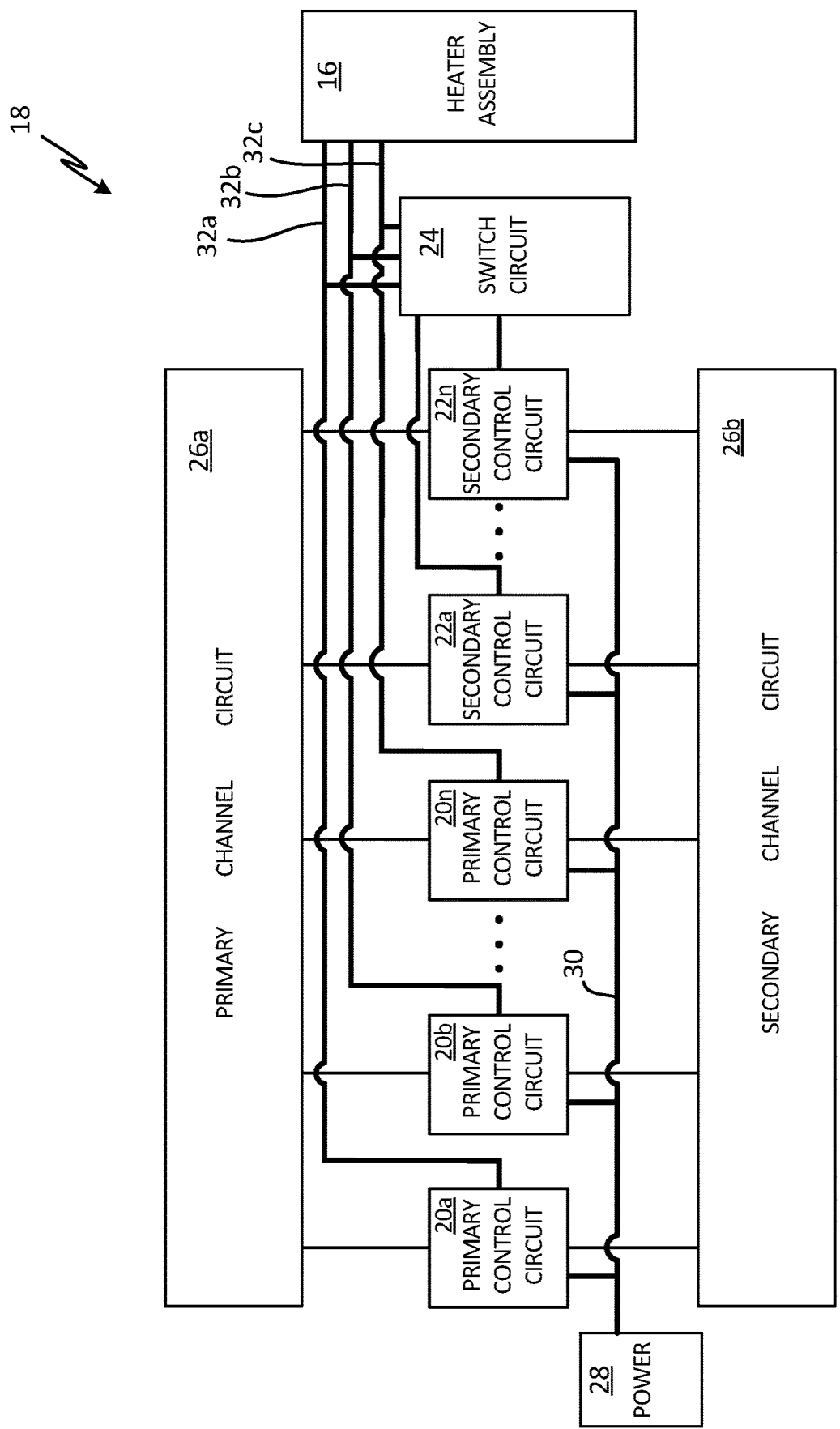
FIG. 2 is a block diagram illustrating a redundant power control system that includes primary control circuits and secondary control circuits.

FIG. 2 is a block diagram illustrating redundant power control system 18. Control system 18 may be utilized for each of control units 18a-18n of FIG. 1, for example. Redundant power control system 18 includes primary control circuits 20a-20n, secondary control circuits 22a-22n, switch circuit 24, primary channel circuit 26a, secondary channel circuit 26b, power input 28, power bus 30, and load input power lines 32a-32c. Heater assembly 16 may be any of heater assemblies 16a-16n of FIG. 1, or may be any other load that includes multiple zones or sub-loads, for example.

Power input 28 may provide alternating current (AC) power or direct current (DC) power. For example, power bus 30 may be an aircraft power bus that carries multiphase AC power from one of the engine generators. Power bus 30 is connected to supply power to primary control circuits 20a-20n and secondary control circuits 22a-22n. While illustrated as a single line, power bus 30 may include any number of input power lines. For example, if power input 28 is aircraft AC power, power bus 30 may include three input lines for the three phases of AC power.

Heater assembly 16, or any other load, may be divided into zones, or may include several separate loads, for example. Each zone or separate load may be powered separately through a dedicated primary control circuit 20a-20n. The respective primary control circuit 20a-20n may include a solid state switching device, for example, controlled to selectively provide power from power bus 30 to a respective one of load input power lines 32a-32c. Each load input power line 32a-32c may be connected to a respective zone of heater assembly 16, for example. while illustrated in FIG. 1 as three input power lines 32a-32c, any number of input power lines can be utilized.

Primary channel circuit 26a and secondary channel circuit 26b may be configured to provide fully redundant zone activation, scheduling, and monitoring functions for heater assembly 16. For example, primary channel circuit 26a may be given control while secondary channel circuit 26b acts as a backup channel circuit. In the event of a disabling fault in primary channel circuit 26a, secondary channel circuit 26b may assume control. Hardware and/or software interlocks, for example, may be implemented to ensure that only one channel circuit 26a or 26b has active control at any given time. The channel circuit 26a or 26b that is currently in control determines when to turn on or off each zone and actively monitors primary control circuits 20a-20n for faults. If a fault is detected, the active channel circuit 26a or 26b may disconnect affected primary control zone 20a-20n from power bus 30.

Following disconnection of power bus 30 from the respective primary control circuit 20a-20n, switch circuit 24 may be controlled to connect one of secondary control circuits 22a-22n in place of the faulty primary control circuit 20a-20n. For example, if a fault is detected in primary control circuit 20a, switch circuit 24 may be controlled to connect secondary control circuit 22a to load power input line 32a. This way, secondary control circuit 22a may assume control of power from power bus 30 to load power input line 32a.

While illustrated as multiple secondary control circuits 22a-22n, in other embodiments, a single secondary control circuit may be utilized. Switch circuit 24 is configured to allow connection of each secondary control circuit 22a-22n to any of load input power lines 32a-32c. This way, any secondary control circuit 22a-22n may be utilized in place of any primary control circuit 20a-20n.

Figure 3:
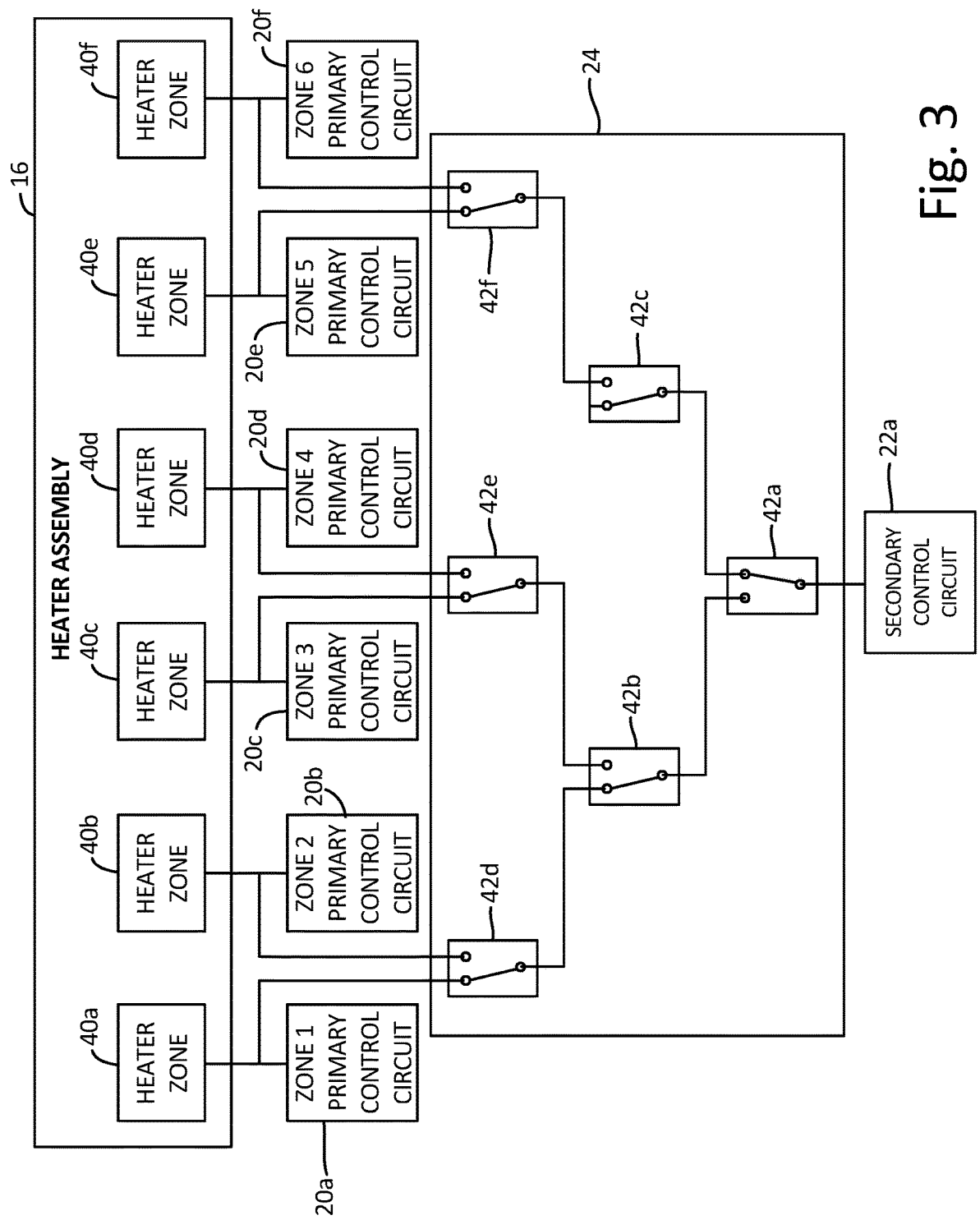
FIG. 3 is a block diagram illustrating a switch circuit for connecting a secondary control circuit in place of multiple primary control circuits.

FIG. 3 is a block diagram illustrating switch circuit 24 for redundant power control system 18. In the embodiment illustrated in FIG. 3, heater assembly 16 includes six heater zones 40a-40f, controlled by respective primary control circuits 20a-20f. A single secondary control circuit 22a acts as a backup power control circuit for all of primary control circuits 20a-20f. In other embodiments, any number of heater zones 40 may be implemented with any number of secondary control circuits 22a-22n.

Switch circuit 24 includes switches 42a-42f. While illustrated as six switches 42a-42f, any number of switches may be used to satisfy the number of secondary control circuits 22a-22n that must be routed to heater zones 40a-40f. Switches 42a-42f may be implemented using mechanical relays, power metal-oxide-semiconductor field-effect transistors (MOSFETs), or any other type of mechanical and/or electrical switching devices. While illustrated a switch matrix with six switches 42a-42f, switch circuit 24 may be configured in any way that allows selective connection of secondary control circuits 22a-22n to any heater zone 40a-40f.

Channel control circuits 26a and 26b (FIG. 2) may control switches 42a-42f to connect secondary control circuit 22a to one of heater zones 40a-40f. FIG. 3 illustrates a default state in which all primary control circuits 20a-20n are functioning normally. In this default state, secondary control circuit 22a is not connected to any heater zone 40a-40f due to the open circuit created by switch 42c. Upon detection of a fault in any of primary control circuits 20a-20f, switches 42a-42f are controlled to connect secondary control circuit in place of the faulty primary control circuit 20a-20f. For example, a fault in primary channel circuit 20b may be detected by primary channel circuit 26a. Upon detection of the fault in primary control circuit 20b, primary channel circuit 26a may control switch circuit 24 to connect secondary control circuit 22a to heater zone 40b. To do this, switch 42a is controlled to route power from secondary control circuit 22a to switch 42b. Switch 42b is controlled to route power to switch 42d, and switch 42d is controlled to route power to heater zone 40b.

Figure 4:
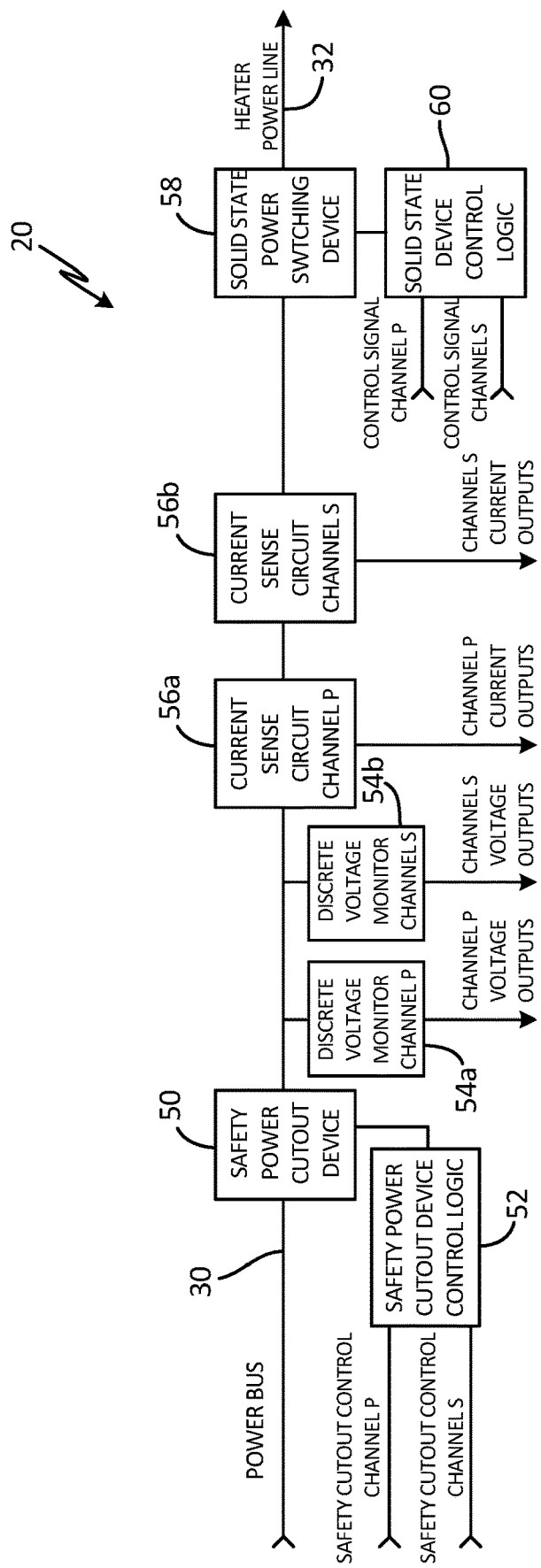
FIG. 4 is a block diagram illustrating a control unit of a redundant power control system.

FIG. 4 is a block diagram illustrating control circuit 20 of a redundant power control system 18. Control circuit 20 may be any of primary control circuits 20a-20n, or secondary control circuits 22a-22n of FIGS. 2 and 3. Control circuit 20 includes safety power cutout device 50, cutout device control logic 52, voltage monitors 54a and 54b, current sense circuits 56a and 56b, solid state switching device 58, and solid state switching device control logic 60. Safety power cutout device 50 may be a mechanical relay, or other mechanical or electrical device capable of terminating power flow from power bus 30. Cutout device control logic 52 receives input from both primary channel circuit 26a and secondary channel circuit 26b. Cutout device control logic 52 may be any digital and/or analog circuitry capable of controlling safety power cutout device 50 based on input from channel control circuits 26a and 26b. This way, primary channel circuit 26a and secondary channel circuit 26b are able to terminate power flow from power bus 30 upon detection of a fault, for example.

Voltage monitors 54a and 54b, and current sense circuit circuits 56a and 56b are configured to monitor the voltage and current, respectively, within control circuit 20. Voltage monitor 54a and current sense circuit 56a are connected to provide outputs to primary channel circuit 26a, and voltage monitor 54b and current sense circuit 56b are connected to provide outputs to secondary channel circuit 26b. Voltage monitors 54a and 54b may be any analog and/or digital circuit elements capable of providing output signals indicative of voltage on power within control circuit 20. Current sense circuits 56a and 56b are any circuit elements capable of providing a signal indicative of current within control circuit 20 such as, for example, shunt resistors, Hall effect sensors, current transformers, or any other current sensing devices.

Solid state power switching device 58, which may be a solid state metal-oxide-semiconductor field-effect transistor (MOSFET), for example, is controlled to connect power from power bus 30 to heater power input line 32. Channel control circuits 26a and 26b control solid state power switching device 58 through control logic 60 to selectively apply power to a respective heater zone 40a-40f (FIG. 3). Control logic 60 may be any digital and/or analog circuitry configured to control solid state power switching device 58 based on input from channel control circuits 26a and 26b.

Channel control circuits 26a and 26b may monitor respective outputs from voltage monitors 54a and 54b, and current sense circuits 56a and 56b to monitor for faults within control circuit 20. For example, a short circuit fault may occur, which may be detected by channel circuits 26a and 26b using respective current sense circuits 56a and 56b. Upon detection of the fault, channel control circuits 26a and 26b may control safety power cutout device 50 to terminate power to control circuit 20 from power bus 30. Following termination of power, channel control circuits 26a and 26b may control switch circuit 24 to connect a secondary control circuit 22a-22n in place of faulty control circuit 20.

All primary control circuits 20a-20n and secondary control circuits 22a-22n may be implemented similar to the embodiment illustrated in FIG. 4. This way, if a first secondary control circuit 22a is connected to a zone 40a-40f, and later has a fault, a second secondary control circuit 22b, for example, may be connected in place of the first, faulty, secondary control circuit 22a. Thus, by using secondary control circuits 22a-22n in conjunction with switch circuit 24, the size, weight, and cost of control system 18 may be reduced, while the flexibility of control system 18 may be increased.

DISCUSSION OF POSSIBLE EMBODIMENTS

The following are non-exclusive descriptions of possible embodiments of the present invention.

A system includes a power source, a plurality of primary control circuits, a load, at least one secondary control circuit, a switch circuit, and a control channel. The plurality of primary control circuits are connected to control load power from the power source to respective ones of a plurality of load power inputs. The load is configured to receive power from the plurality of load power inputs. The at least one secondary control circuit is connected to the power source, and the switch circuit is connected between the at least one secondary control circuit and the plurality of load power inputs. The control channel is configured to control the switch circuit to connect the at least one secondary control circuit to a selected one of the plurality of load power inputs.

The system of the preceding paragraph can optionally include, additionally and/or alternatively, any one or more of the following features, configurations and/or additional components:

A further embodiment of the foregoing system, wherein the system is an aircraft nacelle ice protection system, and wherein the load is a heater assembly configured to generate heat for an inlet of the aircraft nacelle upon receipt of the load power.

A further embodiment of any of the foregoing systems, wherein the heater assembly includes a plurality of zones, and wherein the plurality of zones are connected to the plurality of load power inputs.

A further embodiment of any of the foregoing systems, wherein the power source is a three-phase alternating current power bus.

A further embodiment of any of the foregoing systems, wherein each of the plurality of primary control circuits includes a solid state switching device, and wherein the control channel is further configured to control the solid state switching device of each of the plurality of primary control circuits to control the load power from the power source to the respective ones of the plurality of load power inputs.

A further embodiment of any of the foregoing systems, wherein the control channel comprises a primary control channel circuit and a secondary control channel circuit, wherein each of the primary control channel circuit and the secondary control channel circuit are capable of controlling the solid state switching device of each of the plurality of primary control circuits, and controlling the switch circuit to connect the at least one secondary control circuit to the selected one of the plurality of load power inputs.

A further embodiment of any of the foregoing systems, wherein the control channel is further configured to detect a fault in one of the plurality of primary control circuits, and control the switch circuit to connect the at least one secondary control circuit to the selected one of the plurality of load power inputs upon detection of the fault.

A further embodiment of any of the foregoing systems, wherein each of the plurality of primary control circuits comprise a voltage monitor configured to provide a sensed voltage to the control channel and a current sense circuit configured to provide a sensed current to the control channel, and wherein the control channel is further configured to detect the fault in the one of the plurality of primary control circuits based on the sensed current and the sensed voltage.

A further embodiment of any of the foregoing systems, wherein each of the plurality of primary control circuits further comprise a safety power cutout device, and wherein the control channel is further configured to control the safety power cutout device of the one of the plurality of primary control circuits to disconnect the one of the plurality of primary control circuits from the power input upon detection of the fault.

A further embodiment of any of the foregoing systems, wherein the switch circuit comprises a plurality of switches connected between the at least one secondary control circuit and the plurality of load power inputs, and wherein the control channel is further configured to control the plurality of switches to selectively connect the secondary control circuit to the selected one of the plurality of power inputs.

A method of controlling power to a load includes controlling, by a plurality of primary control circuits, power from a power source to respective ones of a plurality of load power inputs; monitoring, by a control channel, the plurality of primary control circuits for faults; detecting, by the control channel, a first fault in a first one of the plurality of primary control circuits, wherein the first one of the plurality of primary control circuits is connected to provide the power from the power source to a first one of the plurality of load power inputs; and controlling, by the control channel, a switch circuit to connect a first secondary control circuit to provide the power from the power source to the first one of the plurality of load power inputs.

The method of the preceding paragraph can optionally include, additionally and/or alternatively, any one or more of the following features, configurations and/or additional components:

A further embodiment of the foregoing method, wherein the load is a heater assembly of an aircraft nacelle ice protection system.

A further embodiment of any of the foregoing methods, wherein controlling, by the plurality of primary control circuits, the power from the power source to the respective ones of the plurality of load power inputs includes providing the power from the respective ones of the plurality of load power inputs to a plurality of zones of the heater assembly.

A further embodiment of any of the foregoing methods, wherein the power source is a three-phase alternating current power bus.

A further embodiment of any of the foregoing methods, wherein controlling, by the plurality of primary control circuits, the power from the power source to the respective ones of the plurality of load power inputs includes controlling a solid state switching device of each of the plurality of primary control circuits to control the power from the power source to the respective ones of the plurality of load power inputs.

A further embodiment of any of the foregoing methods, wherein monitoring, by the control channel, the plurality of primary control circuits for faults includes monitoring, by a primary channel circuit, the plurality of primary control circuits for faults; and providing, by a secondary channel circuit, redundancy for the primary channel circuit.

A further embodiment of any of the foregoing methods, wherein monitoring, by the control channel, the plurality of primary control circuits for faults comprises monitoring, from each of the plurality of primary control circuits, a sensed voltage and a sensed current.

A further embodiment of any of the foregoing methods, wherein detecting, by the control channel, the first fault in the first one of the plurality of primary control circuits comprising detecting the first fault based on at least one of the sensed voltage and the sensed current.

A further embodiment of any of the foregoing methods, further including disconnecting, by the control channel, the first one of the plurality of primary control circuits using a safety power cutout device of the first one of the plurality of primary control circuits.

A further embodiment of any of the foregoing methods, further including detecting, by the control channel, a second fault in a second one of the plurality of primary control circuits, wherein the second one of the plurality of primary control circuits is connected to provide the power from the power source to a second one of the plurality of load power inputs; and controlling, by the control channel, the switch circuit to connect a second secondary control circuit to provide the power from the power source to the second one of the plurality of load power inputs.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a power source;
   a plurality of primary control circuits connected to control load power from the power source to respective ones of a plurality of load power inputs;
   a load configured to receive power from the plurality of load power inputs;
   at least one secondary control circuit connected to the power source;
   a switch circuit connected between the at least one secondary control circuit and the plurality of load power inputs; and
   a control channel,
      wherein the control channel is configured to control the switch circuit to connect the at least one secondary control circuit to a selected one of the plurality of load power inputs, and
      wherein the control channel is further configured to detect a fault in one of the plurality of primary control circuits, and control the switch circuit to connect the at least one secondary control circuit to the selected one of the plurality of load power inputs upon detection of the fault.

2. The system of claim 1, wherein the system is an aircraft nacelle ice protection system, and wherein the load is a heater assembly configured to generate heat for an inlet of the aircraft nacelle upon receipt of the load power.

3. The system of claim 2, wherein the heater assembly includes a plurality of zones, and wherein the plurality of zones are connected to the plurality of load power inputs.

4. The system of claim 1, wherein the power source is a three-phase alternating current power bus.

5. The system of claim 1, wherein each of the plurality of primary control circuits includes a solid state switching device, and wherein the control channel is further configured to control the solid state switching device of each of the plurality of primary control circuits to control the load power from the power source to the respective ones of the plurality of load power inputs.

6. The system of claim 5, wherein the control channel comprises a primary control channel circuit and a secondary control channel circuit, wherein each of the primary control channel circuit and the secondary control channel circuit are capable of controlling the solid state switching device of each of the plurality of primary control circuits, and controlling the switch circuit to connect the at least one secondary control circuit to the selected one of the plurality of load power inputs.

7. The system of claim 1, wherein each of the plurality of primary control circuits comprise a voltage monitor configured to provide a sensed voltage to the control channel and a current sense circuit configured to provide a sensed current to the control channel, and wherein the control channel is further configured to detect the fault in the one of the plurality of primary control circuits based on the sensed current and the sensed voltage.

8. The system of claim 7, wherein each of the plurality of primary control circuits further comprise a safety power cutout device, and wherein the control channel is further configured to control the safety power cutout device of the one of the plurality of primary control circuits to disconnect the one of the plurality of primary control circuits from the power input upon detection of the fault.

9. The system of claim 1, wherein the switch circuit comprises a plurality of switches connected between the at least one secondary control circuit and the plurality of load power inputs, and wherein the control channel is further configured to control the plurality of switches to selectively connect the secondary control circuit to the selected one of the plurality of power inputs.

10. A method of controlling power to a load, the method comprising:
   controlling, by a plurality of primary control circuits, power from a power source to respective ones of a plurality of load power inputs, wherein controlling, by the plurality of primary control circuits, the power from the power source to the respective ones of the plurality of load power inputs comprising controlling a solid state switching device of each of the plurality of primary control circuits to control the power from the power source to the respective ones of the plurality of load power inputs;

monitoring, by a control channel, the plurality of primary control circuits for faults, wherein monitoring, by the control channel, the plurality of primary control circuits for faults comprises:
monitoring, by a primary channel circuit, the plurality of primary control circuits for faults; and
providing, by a secondary channel circuit, redundancy for the primary channel circuit;

detecting, by the control channel, a first fault in a first one of the plurality of primary control circuits, wherein the first one of the plurality of primary control circuits is connected to provide the power from the power source to a first one of the plurality of load power inputs; and controlling, by the control channel, a switch circuit to connect a first secondary control circuit to provide the power from the power source to the first one of the plurality of load power inputs.

11. The method of claim 10, wherein the load is a heater assembly of an aircraft nacelle ice protection system.

12. The method of claim 11, wherein controlling, by the plurality of primary control circuits, the power from the power source to the respective ones of the plurality of load power inputs comprises providing the power from the respective ones of the plurality of load power inputs to a plurality of zones of the heater assembly.

13. The method of claim 10, wherein the power source is a three-phase alternating current power bus.

14. The method of claim 10, further comprising disconnecting, by the control channel, the first one of the plurality of primary control circuits using a safety power cutout device of the first one of the plurality of primary control circuits.

15. The method of claim 10, further comprising:
detecting, by the control channel, a second fault in a second one of the plurality of primary control circuits, wherein the second one of the plurality of primary control circuits is connected to provide the power from the power source to a second one of the plurality of load power inputs; and
controlling, by the control channel, the switch circuit to connect a second secondary control circuit to provide the power from the power source to the second one of the plurality of load power inputs.

16. A method of controlling power to a load, the method comprising:
controlling, by a plurality of primary control circuits, power from a power source to respective ones of a plurality of load power inputs;
monitoring, by a control channel, the plurality of primary control circuits for faults, wherein monitoring, by the control channel, the plurality of primary control circuits for faults comprises monitoring, from each of the plurality of primary control circuits, a sensed voltage and a sensed current;
detecting, by the control channel, a first fault in a first one of the plurality of primary control circuits, wherein the first one of the plurality of primary control circuits is connected to provide the power from the power source to a first one of the plurality of load power inputs; and
controlling, by the control channel, a switch circuit to connect a first secondary control circuit to provide the power from the power source to the first one of the plurality of load power inputs.

17. The method of claim 16, wherein detecting, by the control channel, the first fault in the first one of the plurality of primary control circuits comprising detecting the first fault based on at least one of the sensed voltage and the sensed current.

18. The method of claim 16, further comprising disconnecting, by the control channel, the first one of the plurality of primary control circuits using a safety power cutout device of the first one of the plurality of primary control circuits.

19. The method of claim 16, further comprising:
detecting, by the control channel, a second fault in a second one of the plurality of primary control circuits, wherein the second one of the plurality of primary control circuits is connected to provide the power from the power source to a second one of the plurality of load power inputs; and
controlling, by the control channel, the switch circuit to connect a second secondary control circuit to provide the power from the power source to the second one of the plurality of load power inputs.

20. The method of claim 16, wherein the power source is a three-phase alternating current power bus.

* * * * *